(12) United States Patent
Oostendorp et al.

(10) Patent No.: US 11,921,014 B2
(45) Date of Patent: *Mar. 5, 2024

(54) SYSTEM AND METHOD FOR MONITORING MANUFACTURING

(71) Applicant: Sight Machine, Inc., San Francisco, CA (US)

(72) Inventors: Nathan Oostendorp, Ann Arbor, MI (US); Kurtis Alan Demaagd, Chelsea, MI (US); Ryan L. Smith, San Francisco, CA (US)

(73) Assignee: Sight Machine, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,171

(22) Filed: Apr. 19, 2022

(65) Prior Publication Data

US 2022/0397488 A1 Dec. 15, 2022

Related U.S. Application Data

(63) Continuation of application No. 17/012,334, filed on Sep. 4, 2020, now Pat. No. 11,340,142, which is a continuation of application No. 15/723,016, filed on Oct. 2, 2017, now Pat. No. 10,768,076.

(60) Provisional application No. 62/402,835, filed on Sep. 30, 2016.

(51) Int. Cl.
*G01M 99/00* (2011.01)
*G06F 16/907* (2019.01)

(52) U.S. Cl.
CPC ......... *G01M 99/005* (2013.01); *G06F 16/907* (2019.01)

(58) Field of Classification Search
CPC .................................................. G01M 99/005
USPC ........................................................ 702/183
See application file for complete search history.

(56) References Cited

U.S. PATENT DOCUMENTS

| 5,659,467 A | 8/1997 | Vickers |
| 6,862,486 B2 | 3/2005 | Cocco et al. |
| 6,985,779 B2 | 1/2006 | Hsiung et al. |

(Continued)

OTHER PUBLICATIONS

Corrected Notice of Allowance received for U.S. Appl. No. 15/373,337, dated Sep. 11, 2019, 2 pages.

(Continued)

*Primary Examiner* — Ricky Go
(74) *Attorney, Agent, or Firm* — DLA Piper LLP (US)

(57) ABSTRACT

A method includes receiving raw data and generating a manufacturing data packet (MDP) that includes at least a portion of the raw data. Generating the MDP includes associating metadata with the raw data and associating a timestamp with the raw data. The timestamp is synchronized to a common reference time. A data model associated with the MDP is obtained. The data model includes one or more predefined data types and one or more predefined data fields. A first data type from the one or more predefined data types is determined based at least in part on characteristics of the raw data. An algorithm is determined based at least in part on the first data type. The MDP is processed according to the algorithm to produce an output. The first data type is associated with the raw data. The output is associated with a data field of the first data type.

20 Claims, 8 Drawing Sheets

(56) References Cited

U.S. PATENT DOCUMENTS

| | | | |
|---|---|---|---|
| 7,000,193 B1* | 2/2006 | Impink, Jr. | G05B 23/027 |
| | | | 700/17 |
| 7,650,198 B2 | 1/2010 | Dorgelo et al. | |
| 7,668,186 B1* | 2/2010 | Nelson, IV | H04L 49/90 |
| | | | 370/428 |
| 10,386,827 B2 | 8/2019 | Enver et al. | |
| 10,481,597 B2 | 11/2019 | Oostendorp et al. | |
| 2002/0069349 A1 | 6/2002 | Toprac | |
| 2004/0254762 A1 | 12/2004 | Hopkins et al. | |
| 2005/0081410 A1 | 4/2005 | Furem et al. | |
| 2005/0187649 A1 | 8/2005 | Funk et al. | |
| 2005/0222813 A1 | 10/2005 | Bjornson et al. | |
| 2007/0244571 A1* | 10/2007 | Wilson | G05B 19/042 |
| | | | 707/E17.005 |
| 2010/0161101 A1 | 6/2010 | Pouyez et al. | |
| 2013/0232137 A1* | 9/2013 | Knott | H04L 63/1425 |
| | | | 707/722 |
| 2014/0047107 A1 | 2/2014 | Maturana et al. | |
| 2016/0321594 A1 | 11/2016 | Linde et al. | |
| 2017/0102693 A1 | 4/2017 | Kidd et al. | |
| 2017/0371322 A1 | 12/2017 | Lake et al. | |

OTHER PUBLICATIONS

Extended European Search Report received for European Patent Application No. 16886686.1, dated Jul. 8, 2019, 8 pages.
International Preliminary Report on Patentability received for PCT Patent Application No. PCT/US2016/000127, dated Jun. 21, 2018, 11 pages.
International Search Report and Written Opinion received for PCT Patent Application No. PCT/US16/00127, dated Jun. 16, 2017, 13 pages.
Non-Final Office Action received for U.S. Appl. No. 15/373,337, dated Jan. 10, 2019, 20 pages.
Non-Final Office Action received for U.S. Appl. No. 15/723,016, dated Sep. 5, 2019, 8 pages.
Non-Final Office Action received for U.S. Appl. No. 16/687,046, dated Jun. 9, 2020, 13 pages.
Non-Final Office Action received for U.S. Appl. No. 17/012,334, dated Aug. 18, 2021, 11 pages.
Notice of Allowance received for Canadian Patent Application No. 3,007,973, dated May 4, 2020, 1 page.
Notice of Allowance received for U.S. Appl. No. 15/373,337, dated Jul. 18, 2019, 9 pages.
Notice of Allowance received for U.S. Appl. No. 15/723,016, dated May 11, 2020, 8 pages.
Notice of Allowance received for U.S. Appl. No. 17/012,334, dated Jan. 24, 2022, 8 pages.
Office Action received for Canadian Patent Application No. 3,007,973, dated Apr. 2, 2019, 6 pages.
Office Action received for European Patent Application No. 16886686.1, dated Jul. 23, 2020, 6 pages.

* cited by examiner

|   | A | B | C | D | E |
|---|---|---|---|---|---|
|   | RAW FIELD | UNIT | TYPE | FUNCTION | DATA FIELD |
| 1 | ServoCurrent | mV | Continuous | Minimum | ServoCurrent_Min |
| 2 | ServoCurrent | mV | Continuous | Maximum | ServoCurrent_Max |
|   | Raw Field | Unit | Type | Maximum | Data Field Name |
|   | Raw Field | Unit | Type | Maximum | Data Field Name |
|   | Raw Field | Unit | Choose a Type | Choose a Function | Data Field Name |
|   | Raw Field | Unknown Unit | Type | Maximum | Data Field Name |
|   | Raw Field | Unit | Type | Maximum | Data Field Name |
|   | Raw Field | Unit | Type | Maximum | Data Field Name |
|   | Raw Field | Unit | Choose a Type | Choose a Function | Data Field Name |
|   | Raw Field | Unit | Type | Maximum | Data Field Name |

SYSTEM AND METHOD FOR MONITORING MANUFACTURING

CROSS-REFERENCE TO RELATED APPLICATIONS

This application is a continuation of U.S. patent application Ser. No. 17/012,334, entitled "SYSTEM AND METHOD FOR MONITORING MANUFACTURING," filed Sep. 4, 2020, which is a continuation of U.S. patent application Ser. No. 15/723,016, entitled "SYSTEM AND METHOD FOR MONITORING MANUFACTURING", filed Oct. 2, 2017, which claims the benefit of provisional U.S. patent application No. 62/402,835, filed Sep. 30, 2016, the content of each of which is hereby incorporated by reference in its entirety.

BACKGROUND

Modern manufacturing factories generate a steady stream of complex, heterogeneous factory data collected from various types of sensors distributed throughout the manufacturing factories. Such data is key for improving operations and product quality and for addressing manufacturing problems, such as inefficiencies and underperformance attributed to machine downtimes, supply chain interruptions, and poor quality among others. However, traditional approaches for using the data are limited and cumbersome. Traditional approaches are also reactive in the sense that manufacturers typically wait until a problem has been identified before investigating and collecting data to identify the cause of the problem. As a result, there can be significant lag times between when a manufacturer is aware of a problem and when solutions are finally implemented. As another example, there can be difficulties in tracing problems that are detected in a final completed product to specific root causes among the many machines and processes. These difficulties are caused or exacerbated by challenges in extracting information and knowledge that may be hidden amongst a diverse and large amount of factory data. Manufacturing problems, especially if identified too late, may require costly corrective measures, such as additional product inspections, warranty claims and recalls, reworking products, and so on. Therefore, there is a need for a faster, more real-time, or predictive approach to effectively using the factory data and providing actionable solutions to manufacturers for improving their operations and product quality.

This application is intended to address such issues and to provide related advantages.

SUMMARY

In general, the systems and methods disclosed herein are directed to manufacturing and, more particularly, to manufacturing analytics.

In one aspect, the present disclosure provides for a system for monitoring manufacturing that includes one or more sensors and a controller in operative communication with the one or more sensors. The controller may include one or more processors and a memory that is communicatively coupled with and readable by the one or more processing. The memory may have stored thereon processor-readable instructions that, when executed by the one or more processors, cause the one or more processors to receive raw data from a source and generate a manufacturing data packet that includes at least a portion of the raw data, where generating the manufacturing data packet includes associating metadata with the raw data and associating a timestamp with the raw data, where the timestamp is synchronized to a common reference time. The instructions also cause the one or more processors to: obtain a data model associated with the manufacturing data packet, where the data model includes one or more predefined data types and one or more predefined data fields; determine a first data type from the one or more predefined data types based at least in part on characteristics of the raw data; determine an algorithm based at least in part on the first data type; process the manufacturing data packet according to the algorithm to produce an output; associate the raw data with the first data type of the data model; and associate the output with a data field of the first data type of the data model.

In another aspect, the present disclosure provides for a method for monitoring manufacturing. The method may include receiving raw data from a source and generating a manufacturing data packet that includes at least a portion of the raw data, where generating the manufacturing data packet includes associating metadata with the raw data and associating a timestamp with the raw data, where the timestamp is synchronized to a common reference time. The method may also include: obtaining a data model associated with the manufacturing data packet, where the data model includes one or more predefined data types and one or more predefined data fields; determining a first data type from the one or more predefined data types based at least in part on characteristics of the raw data; determining an algorithm based at least in part on the first data type; processing the manufacturing data packet according to the algorithm to produce an output; associating the first data type with the raw data; and associating the output with a data field of the first data type.

BRIEF DESCRIPTION OF THE FIGURES

The present application can be best understood by reference to the following description taken in conjunction with the accompanying drawing figures, in which like parts may be referred to by like numerals.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown but is to be accorded the scope consistent with the claims.

Techniques described herein are performed by software objects in some embodiments. For purposes of this disclosure, software objects may be instantiated and resident in memory. In some embodiments, computer-executable programs and corresponding instructions are provided to create and process software objects.

Manufacturers are concerned with high efficiency production processes and product quality. Important to addressing these concerns is the stream of factory data that is generated by manufacturing equipment, machines, and tools. The present systems and methods disclosed herein provide for an improved approach for monitoring manufacturing through an integrated system that collects the factory data, organizes the data into models, analyzes the data, and presents the data and analytics. In practice, the present systems and methods may provide timely, and actionable information that can be implemented by the manufacturers for improving their production processes and product quality. In doing so, the present systems and methods may use the factory data to pinpoint manufacturing problems and their root causes in an efficient manner. One potential advantage in particular is the ability to take a proactive approach to identifying potential issues in a manufacturing process by anticipating problems before they occur. Prior manufacturing data (e.g., training data) may be used to identify manufacturing conditions that led to a problem or defect. By collecting and analyzing manufacturing data in near real time, the problematic conditions can be identified in a timely manner to alert a manufacturer of a potential issue before it occurs. This may allow a manufacturer to proactively address a problem to avoid producing a defective product, which saves time and cost and avoids waste.

Another potential advantage of the techniques described herein is the ability to identify opportunities to improve a manufacturing process other than, or in addition to, avoiding problems. Here again, prior data may be used to identify conditions that resulted in optimal manufacturing performance. A manufacturer can then attempt to improve a process by recreating the desirable conditions.

As described further in succeeding paragraphs, factory data, which may also be referred to herein as "parts and process data," "manufacturing data," and "production data," among other terminology, may be collected from any number of varying sources throughout the manufacturing factory, such as sensors, cameras, text, barcodes, audio files, and laboratory equipment. Factory data may also be obtained from existing data repositories (e.g., enterprise resource planning (ERP) or manufacturing execution (MES) systems). A challenge to using factory data as a tool for improving manufacturing lies within the inherent complexity of the raw data, which may be high in volume, highly varied, and produced at high velocity. The present systems and methods overcome traditional limitations associated with using the factory data and provide a more robust approach for monitoring manufacturing. For instance, the present systems and methods may collect and interpret the data with context and meaning in real time and/or near real time to provide actionable solutions quickly. In practice, the present systems and methods may identify, prevent, and/or resolve manufacturing problems by identifying why an assembly line or subassembly line is down, which may result, for example, from a lack of materials, machine malfunction, missing personnel, and so on. Further, the present systems and methods may correct the problem, assess how quickly the problem is corrected, identify root causes of the problem, and identify trends for predicting future problems. It is contemplated that by quickly and precisely discovering and addressing underlying problems, manufacturers may improve their competitive position through the benefits associated with improved operations and product quality.

Figure 1:
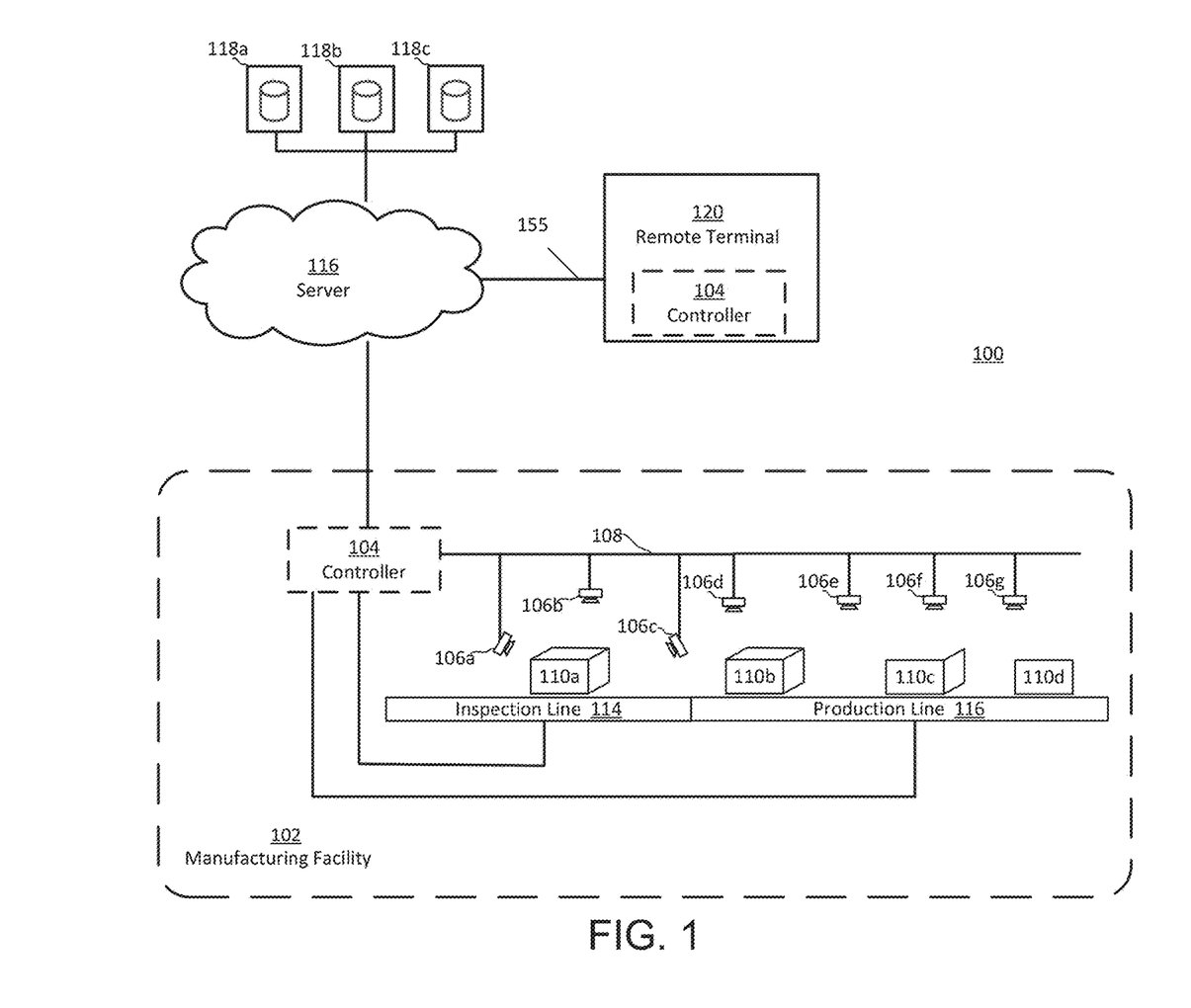
FIG. 1 shows a schematic diagram of a system for monitoring manufacturing, according to various embodiments.

Turning to FIG. 1, an example system 100 for remotely monitoring a manufacturing factory 102 is shown. The manufacturing factory 102 may include one or more controllers 104 in operative communication with one or more sensors 106a-g via a data network 108. The sensors 106a-g may collect data from a plurality of machines, product stages, assembly lines, and/or subassembly lines. For simplicity of illustration, FIG. 1 shows the plurality of sensors 106a-g monitoring a plurality of machines and/or product checkpoints, schematically represented as products 110a-d, at a production assembly line 112 and an inspection assembly line 114. It is noted that any number of products, production stages, machines, sensors, and wireless and/or wired communication channels may be contemplated.

In addition to data that is passively sensed by sensors 106a-g, factory data may include data generated by machines in the production assembly line 112 and/or the inspection assembly line 114. Factory data may also include data calculated by or input into system 100. For example, factory data may include operational parameters of production and/or inspection lines (e.g., a recipe a robot was scheduled to run or a trajectory that was calculated for a robot to follow).

The controller 104 at the manufacturing factory 102 may be in uni- or bi-directional communication with a server 116 that includes and/or otherwise accesses one or more databases 118a-c for storing the sensed factory data, data analytics, activity logs, and so on. A remote terminal 120 may be in operative communication with the manufacturing factory 102 via the server 116. It is contemplated that one or more steps of the monitoring manufacturing techniques described herein may be provided by the controller 104 located at the manufacturing factory 102 and/or the remote terminal 120, at the server 116, and/or any combination thereof. It is noted that while remote monitoring is being shown, one or more features of the present techniques may additionally and/or alternatively be performed on-site. Further, additional and/or alternative communication channels, operating entities or elements, and/or interactions may be contemplated.

The sensors 106a-g may include analog and/or digital sensors, such as bio sensors, chemistry and/or composition sensors, current and/or power sensors, air quality sensors, gas sensors, Hall Effect sensors, lightness level sensors, optical sensors, pressure sensors, temperature sensors, ultrasonic sensors, proximity sensors, door status sensors, motion tracking sensors, humidity sensors, visible and infrared light sensors, cameras, and so on. For example, a door status sensor may detect an open and/or closed state of a door, in addition or alternative to auto-opening and/or auto-locking of the door. Cameras may capture images for visualizing and/or analyzing a particular factory and/or manufactured part. Such sensors may collect data that is further used individually and/or in combination to determine various environmental factors and/or assembly line operating statuses and/or conditions. For example, the sensor data may be utilized to determine if an assembly line is shut down and/or operating properly.

As shown in FIG. 1, the sensors 106a-g may send a signal to the controller 104 via data network 108, which may include one- or two-way wireless communications and/or physical wiring channels, WiFi, Bluetooth, and/or other radio frequencies. In some cases, data collected by the sensors may be stored at the databases 118-c provided on a cloud, such as a cloud server 116, that is accessible through the web and allows for remote data storage, backup, and/or processing. In some examples, the controller 104 includes one or more programmable logic controllers (PLCs), software, and/or microprocessors, which may collect, process, analyze, and/or present the data according to various methods described herein. The controller 104 may trigger one or more flags and/or notifications related to the monitored manufacturing and/or can automatically reconfigure one or more processes in an assembly line according to one or more optimization rules. For example, based on the collected sensor data, the controller 104 may not only report an underperforming machine but also automatically reconfigure one or more stages of the machine in an effort to reduce system downtime. In another aspect, automatically performing such adjustments may further increase safety by eliminating a need for human interaction with the machine. It is contemplated that any of the techniques disclosed herein may be performed by one or more controllers 104 and/or at the server 116.

As mentioned above, server 116 may include a physical server and/or a cloud server. In some examples, one or more databases 118a-c are stored in a cloud server and include data collected from an assembly line, subassembly line, and/or may be modular representing each of a manufacturer's different assembly lines, factories, and/or factory locations, locally and/or globally. Databases 118a-c may also store historical data (e.g., data aggregated from sensors in inspection line 114 and/or production line 116) and data from quality management systems (e.g., ERP, IVIES, etc.). In an exemplary embodiment, the system 100 collects the production data at the controller 104 and sends the collected data to the cloud server 116, which analyzes the data using various machine learning algorithms and other data conditioning and analysis techniques, and presents the data through a graphical user interface as described below. Analytics performed on the manufacturing data may include transformations, calculations, and functions on raw data using models representing manufacturing processes and parts. Such manufacturing analytics applications provide insight on, for example, part quality, process performance, OEE drill-down, root cause analysis, anomaly detection, traceability, real-time SPC, preventive maintenance, and predictive alerting, among others. In another aspect, the general manufacturer can map or otherwise correlate part data with certain parts, and/or machine data with certain machines that manufactured certain parts. For example, if the general manufacturer identifies a machine problem with a particular machine, the present systems and methods may identify which particular parts and/or overall products may have been equipped with the faulty product. The cloud server 116 and/or the controller 104 may provide the data and analysis results to manufacturers through various web frameworks. Such web frameworks may include protocols that support the transfer of data using HTML, JavaScript, and/or JSON so that the remote terminal 120 can display visualizations of the data through a user interface and update those visualizations as new data is computed by the server 116 and/or the controller 104.

Controller 104 and/or server 116 may also provide or include various application programming interfaces ("APIs") for storing the data into databases 118a-c and other data management tools. APIs may aid further in retrieving data from the databases 118a-c for various data management systems, including software as a service ("SaaS") applications that provide access to the database and/or can pull or otherwise retrieve data from the database and create metrics using such data. As noted above, such applications may be provided via web browsers to allow for remote operations management for the manufacturer. It is contemplated that the system 100 may implement a plug-in architecture along with the APIs for data acquisition to provide a plug and play connection with the sensors and/or other data sources, such that unique data types, such as from homegrown manufacturing execution systems ("MES") and/or custom factory information technology ("IT") systems, can be easily integrated.

Various types of communications channels between the entities shown in FIG. 1 may be contemplated, including uni-directional and/or bi-directional, wired and/or wireless communications. Merely by way of example, data network 108 may include an industrial protocol network, such as OPC, Modbus, ProfiNet, and the like. In other examples, any of the communication channels may be a dedicated conduit communication, such as a universal serial bus (USB), IEEE 802 (Ethernet), IEEE 1394 (FireWire), or other high-speed data communication standard. Other examples are possible.

In some embodiments, system 100 includes a manual entry system that allows a user to enter manufacturing data. System 100 may also allow for computer-based entry of manufacturing data (e.g., scraping Excel files from a windows share in a quality lab).

As mentioned above, analytics performed on the manufacturing data may include transformations, calculations, and functions on raw data using data models representing manufacturing processes and/or parts. A data model includes a collection of data that describe the process or part. A process or part may be categorized as a particular data model type. Exemplary data model types include Factory, Machine, Part, Cycle, Downtime, Supplier, Line, Assembly, Batch, and Defect. For example, a data model of type "Machine" may include a collection of data that describes/represents a particular machine. The machine may be represented by the operational state of the machine (e.g., On or Off), the temperature of the machine, and an image of a part that the machine produced. The image of the part describes the characteristics of the machine in that the image may be analyzed to determine the capability of the machine (e.g., its tolerance or ability to produce a part within a tolerance).

More generally, a data model includes one or more streams of data (a.k.a. data stream) from one or more data sources. Exemplary data sources include a machine, a sensor, and a manual input device (e.g., a manual quality inspection point). A data source may provide one or more data streams from different components within a source (e.g., a machine may include a PLC data stream, an IPC data stream, and a camera data stream). A data stream may include one or more raw fields. Exemplary raw fields include temperature, current, humidity, voltage, etc. Each raw field may be classified as a particular data type (e.g., continuous, binary, etc.). For example, a machine (e.g., data source) may provide a data stream including temperature data (e.g., raw field). The temperature data (e.g., raw field) may be classified as a "continuous" data type. The data model may include one or more data fields for a raw field. Exemplary data fields for a continuous data type (e.g., temperature) may include "maximum," "minimum," and "average," respectively representing the maximum, minimum, and average values of the data in the raw field corresponding to the data field.

Initially, a data stream is associated with a particular data model. Tt should be recognized that a data stream may be associated with more than one data model. For example, a data stream from a PLC may be associated with a Cycle model, a Downtime model, and a Defects model.

In some embodiments, a user identifies a particular data stream and associates it with a specific data model. The data model may include predefined types of data that can be used to describe the process or part represented by the data model. The types of data are predefined in the sense that a data model will accept (but not necessarily require) a particular type of data to be used in the data model. In some embodiments, a raw data stream is acquired and prepared for the data model(s) using a two-stage process.

The first stage is referred to as the transport stage. The transport stage identifies a network protocol, format, and/or method associated with the received raw data stream, which is used to properly process the received data. Exemplary protocols include, but are not limited to, Structured Query Language (SQL), OPC Unified Architecture (OPC UA), File Transfer Protocol (FTP), Windows File Sharing Server Message Block (SMB), and CC-Link, Modbus.

The second stage of the data acquisition process is referred to as the parsing stage. Parsing includes mapping the raw data into a format that can be used by the API of the particular analysis system in which the data models are built (e.g., controller 104 and/or server 116). For example, the raw data may include a data file with a known format (e.g., comma separated values (CSV) or Excel (.xls) that can be parsed and mapped into a format that can be used by the API of the particular analysis system. The raw data stream may also include a device designation (e.g., Programmable Logic Controller (PLC)) that corresponds to a particular data format. The device designation therefore allows the raw data stream to be parsed and mapped to a new format. The parsing stage may also include mapping, e.g., Modbus registers and/or OPC tags into a format that can be used by the API of the particular analysis system.

During parsing, the raw data is transformed into a Manufacturing Data Packet that includes the raw data as well as external information associated with the raw data. External information may include, for example, the source of origin of the raw data, a synchronized timestamp (e.g., NTP), serialization information, machine status information, shift schedules (e.g., for a factory), factory location, timezone information, a topography of an associated manufacturing line, a designation of "ERROR" (non-normal if positive) or "OK" (non-normal if negative) codes, and/or user-identified hints for the purpose of the raw data stream. The external data may be included in the Manufacturing Data Packet as metadata, a header field, or configuration settings. The Manufacturing Data Packet may therefore include all information from the raw data as well as the metadata or header fields with the external associated information. Any arbitrary data, such as file attachments, can be included and/or associated with the Manufacturing Data Packet (and thus the raw data included therein). Any combination of transport protocol and parsing technique can be used to generate the Manufacturing Data Packets used by the models described below.

During the parsing stage, the raw data may also be classified as a particular type of data (a "data type"). The data type associated with a raw data stream may be specified manually by a user input. Alternatively, the raw data may be processed and analyzed by the system to automatically determine the data type of the raw data stream based on characteristics of the raw data stream. Determining the data type of the raw data is also referred to herein as "classification" or "categorization." Automatic classification of the raw data may be particularly advantageous for data models that include many (e.g., 1000 or more) raw fields, as manually entering the data type for each raw field can be tedious and time consuming.

In some embodiments, the manufacturing data packets are input into an Artificial Intelligence (AI) classifier for automatic classification. The classifier receives raw data fields and attempts to determine a data type (aka "functional machine type") of the data, based on the characteristics of the raw data stream. Exemplary data types include, but are not limited to, Binary Timing events (limited to 0/1, often repeated in sequence), binary event flags (e.g., changing state infrequently), error codes (e.g., binary events occurring during non-normal operation), categorical numeric values (e.g., numbers used to indicate a mode or function), continuous numeric values (e.g., from sensors), setpoints (e.g., continuous values which are manually set and do not change until set again), recipe designations (e.g., fields which are correlated with changes to other properties in cycle behavior), in-cycle timings (e.g., values with repeated patterns with significant intra-cycle variations), ambient measurements (e.g., values with no pattern intra-cycle but significant variation across inter-cycle averages).

In addition to analyzing a raw field of a data stream to determine a data type, other signal processing functions can be applied to the raw field to determine characteristics of the data or extract information that describes the process or part represented by the data model. Exemplary analysis functions include calculating a maximum, minimum, and/or average value and detecting switching points (e.g., 0 to 1 or 1 to 0 in binary data), rising edges, falling edges, time from a rising edge to a falling edge (e.g., pulse width), pulse repetition frequency, and/or duty cycle. Other exemplary functions include determining the difference between peak and trough values, threshold crossing points, and the frequency spectrum of a signal.

In some embodiments, the functions to be performed on a raw field can be specified manually (e.g., by a user through a user interface). In some embodiments, the classifier can determine particular analysis functions to be applied to a raw data stream or Manufacturing Data. Packet. The analysis functions may be determined by the classifier based on, e.g., heuristics and/or the data type determined for the data stream. For example, if a data stream is classified as a continuous data type, the system may determine that the data should be analyzed to calculate the minimum, maximum, and/or mean value of the data. As another example, based on a data stream being classified as a binary timing event, the data stream may be analyzed to extract switching points (e.g., 0 to 1 or 1 to 0).

In some embodiments, the data type of a raw data stream is selected from a plurality of available predefined data types. The predefined data types from which the data type is selected may be based on the type of data model with which the data stream is associated. The data type determined by the system may be modified or changed manually if necessary to ensure that the data stream is properly classified. Similarly, the functions to be performed on a raw field may be selected from a plurality of functions that are available for a particular type of data (e.g., maximum, minimum, and mean for continuous data). Functions determined automatically by the system may be modified or changed manually if necessary to ensure that the raw field is properly analyzed for the data model.

Figure 4:
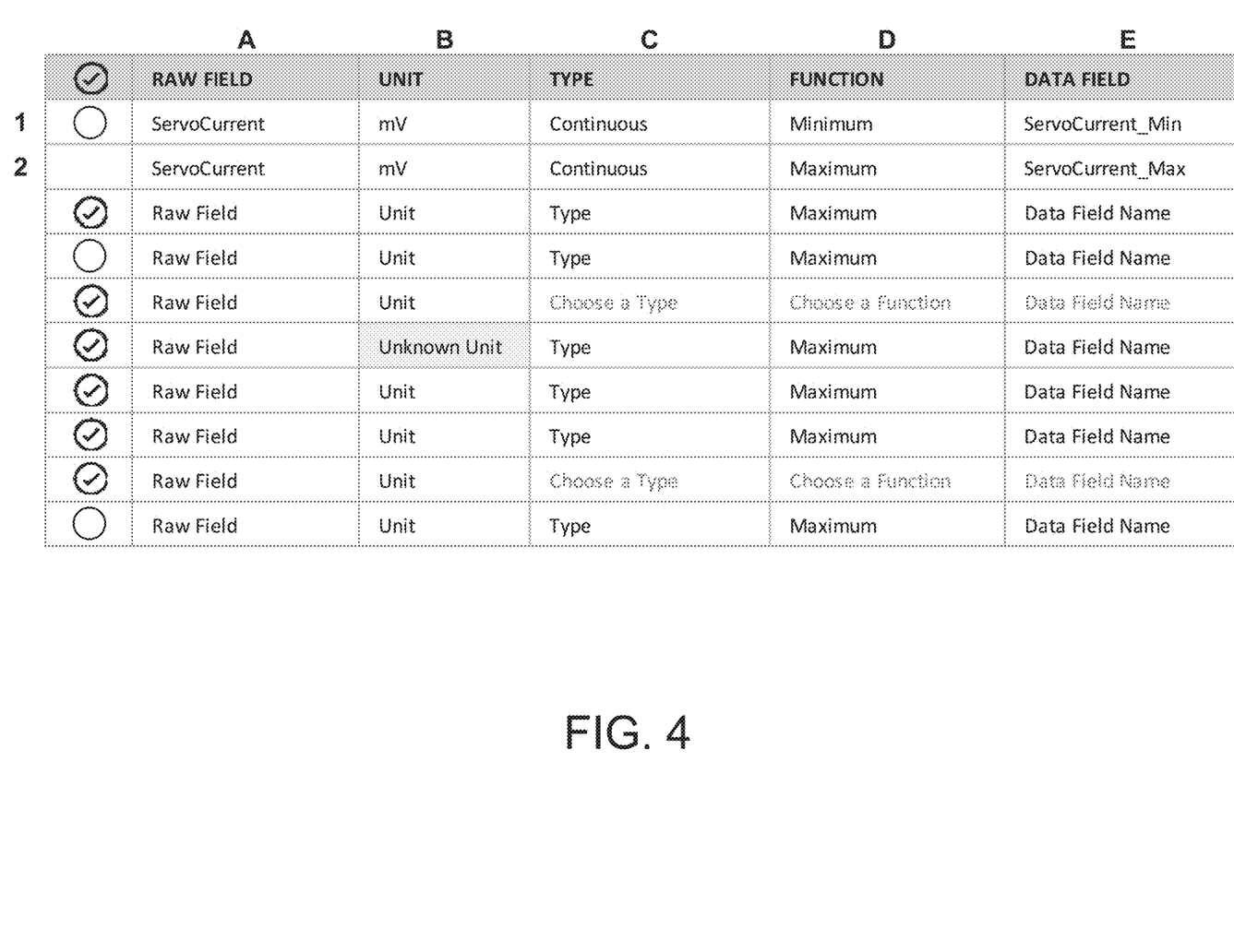
FIG. 4 shows a user interface for defining a data model, according to various embodiments.

FIG. 4 illustrates an exemplary user interface for defining a data model. Each row corresponds to a raw field of a data stream, and each column corresponds to a property of a raw field. Row 1, for example, corresponds to Servo Current data, as indicated by column A. Columns B and C indicate that the servo current data is represented in units of mV and is a "continuous" data type. Column D specifies that a "Minimum" function is to be performed on the servo current data to determine a minimum value of the servo current, which is associated with a data field named "ServoCurrent_Min," as indicated in column F. Additional raw fields from one or more sources can be added to the table to further characterize the process or part represented by the data model.

As described above, more than one function may be performed on a raw field of data. Row 2 also corresponds to the servo current data but is associated with a minimum function that determines a minimum value of the data, as indicated by columns D and E.

System 100 may also provide techniques to manage, based on available system bandwidth, the amount and/or rate of data that is received, processed, and/or stored for use by the data models. These bandwidth management techniques may be implemented at controller 104 and/or server 116. Data may be managed by controlling parameters such as the amount of data acquired on a batch from a data source, the amount of data to be retained in the event of an outage, the amount of data to be retained in a binary data source, etc. These techniques can be used to reduce the raw data on the order of 50-100 times smaller in size. Data reduction can be performed at the point of receiving the data or further downstream prior to being buffered. For example, the raw data can be acquired and processed in batches, which allows for compression across time and reduced bandwidth. For example, a Manufacturing Data Packet as described above can be created for each batch of data, where every Manufacturing Data Packet is associated with a distinct point in time. Associating a distinct point in time may allow arbitrary associated data, such as file attachments, to be included and/or associated with the Manufacturing Data packet. Over time, the Manufacturing Data Packets form a time series of events from multiple assets, products, factories, etc.

A digital model may be populated with Manufacturing Data Packets based on the classification of the data included in the Manufacturing Data. Packet. In particular, the data types and data fields of a digital model may be populated automatically based on the classification performed by the system. In this way, given a set of raw data streams associated with a particular data model, a system can automatically populate the digital model. In addition, a digital model may be related to other digital models that are also being populated as a manufacturing process proceeds. For example, data generated during the creation of a part may be used to populate a PartType model for the part, a MachineType model for the machine that worked on the part, and a BatchType model for a batch of products that includes the part. Also, analysis function performed on the data that is required to populate data field(s) for one model may be used to populate data fields for another model.

Manufacturing Data Packets are applied to data models through an Extract, Transform, and Load (ETL) process. The ETL process may include at least three stages: polling, grouping, and analyzing. Polling includes identifying new data (e.g., completed Manufacturing Data Packets that are ready for analysis). Grouping includes assembling potentially multiple manufacturing data packets into a discrete time range that defines a transaction. A transaction may be, for example, production of a part, a specified time duration, the time between when a machine turns ON to when the machine turns OFF, or the like. Manufacturing Data Packets associated with a particular transaction (e.g., machine cycle) may be bundled in order to be analyzed as a group.

The analyzing stage may include synchronous and/or associative analysis. In synchronous analysis, a transaction is not created until all of the information specified as being required for the transaction is available. For example, if analysis is to be performed on data collected over a period of five seconds, the analysis cannot be performed until the data for the entire period is available. In some embodiments, synchronous analyzers must perform computations of transactions in chronological order.

Associative analysis may be performed on data that is not essential to the characterization of a transaction (e.g., start/stop time, beginning/ending of part completion, shift cycle, etc) but is added later on and potentially out of sequence with any synchronized data. Data may be associated with a transaction using any characteristic or combination of characteristics common to both the data and the transaction. For example, a camera may capture a picture of a part at some time during its manufacture. The picture may be included in a file along with a timestamp of when the picture was captured and/or a serial number associated with the part. The file can later be sent to the system, received, and associated with a Manufacturing Data Packet that shares a common timestamp (or is within a threshold amount of time) and/or serial number. As another example, a Batch Report may be generated on a weekly basis. The batch report may show which batch/lot numbers different machines produced into over a time range. Similar to the file attachment described above, the batch report may be associated with Manufacturing Data Packets based on having a batch/lot number that is common to a batch/lot number associated with the Manufacturing Data Packet.

There may be various types of both synchronous and associative analysis. The type of synchronous analysis performed on a Manufacturing Data Packet may depend on the data type associated with the Manufacturing Data Packet. Similarly, the type of associative analysis performed on a Manufacturing Data Packet may depend on the data type associated with the Manufacturing Data Packet. Examples of synchronous analysis include rich time series analysis (e.g., determination of full entity state at every timestamp (e.g., for PLC data)) and sparse time series analysis (e.g., analysis of specific individual data fields/registers). Examples of associative analysis include change event identification (e.g., process data only when the change in the value of the data exceeds a threshold) and quality data analysis (e.g., analysis of part attribute data, which does not include machine timing data).

One of the potential advantages of the system described above is the ability to automate the labeling of events that impact a key performance indicator (KPI) (e.g., long cycles, downtimes, and defects). Typically, in order to get high-level insight into a manufacturing process, critical events have to be manually identified and coded (e.g., by a machine operator) to determine where bottlenecks in a process occur or which parts of a process cause the most loss through defective production.

With the data model techniques described herein, it may be possible to receive a training set of labeled data from multiple data sources and use Machine Learning techniques to automatically apply the highest probability reason code based on the training set. When combined with a line topography, the data model techniques may also make it possible to determine if downtime codes may be predicted by upstream availability, which is directly useful for determining bottlenecks.

Figure 2:
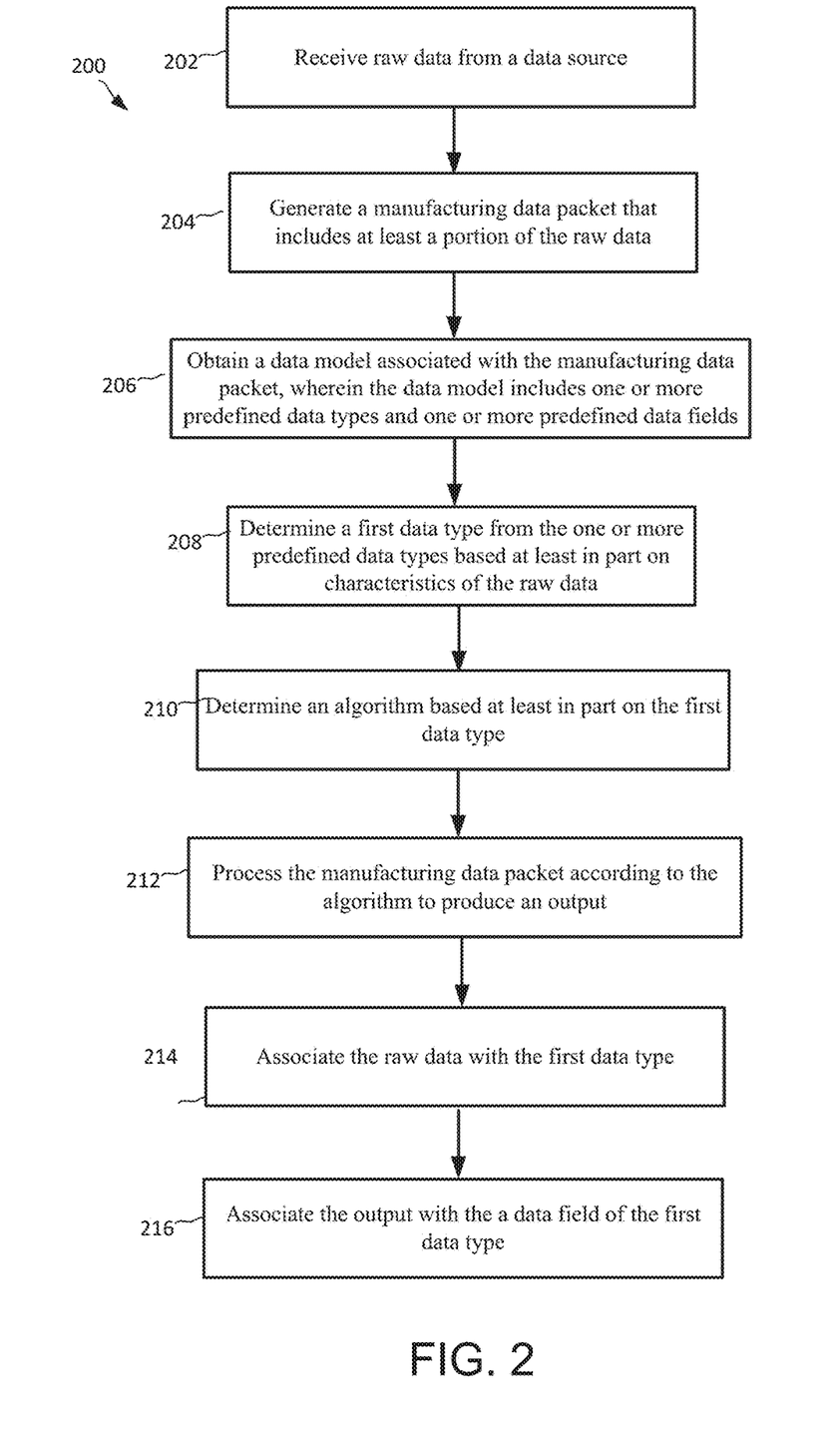
FIG. 2 shows a method for monitoring manufacturing, according to various embodiments.

Turning now to FIG. 2, an example method 200 for monitoring manufacturing is shown. It is contemplated that one or more steps shown in the method 200, and/or any other methods disclosed herein, may be performed by the controller 104, at the server 116, and/or a combination thereof. Further, some steps disclosed herein may be rearranged, removed, and/or modified. Additional steps may be contemplated.

As shown in FIG. 2, the method 200 may include receiving raw data from a data source (step 202) and generating a manufacturing data packet that includes at least a portion of the raw data (step 204). Generating the manufacturing data packet includes associating the metadata with the raw data and associating a timestamp with the raw data, where the timestamp is synchronized to a common reference time. A data model associated with the manufacturing data packet is obtained (step 206), where the data model includes one or more predefined data types and one or more predefined data fields. A first data type is determined from the one or more predefined data types based at least in part on characteristics of the raw data (step 208). An algorithm is determined based at least in part on the first data type (step 210), and the manufacturing data packet is processed according to the algorithm to produce an output (step 212). Then the raw data is associated with the first data type of the data model (step 214), and the output is associated with a data field of the first data type of the data model (step 216).

Once organized into the data models described above, the manufacturing data packets may be further processed to perform additional analysis (e.g., root cause analysis), as described in U.S. Provisional Patent Application No. 62/264,718 ("the '718 Application"), which is incorporated herein by reference in its entirety. In addition, manufacturing data may be visualized as described in the '718 Application.

Figure 5:
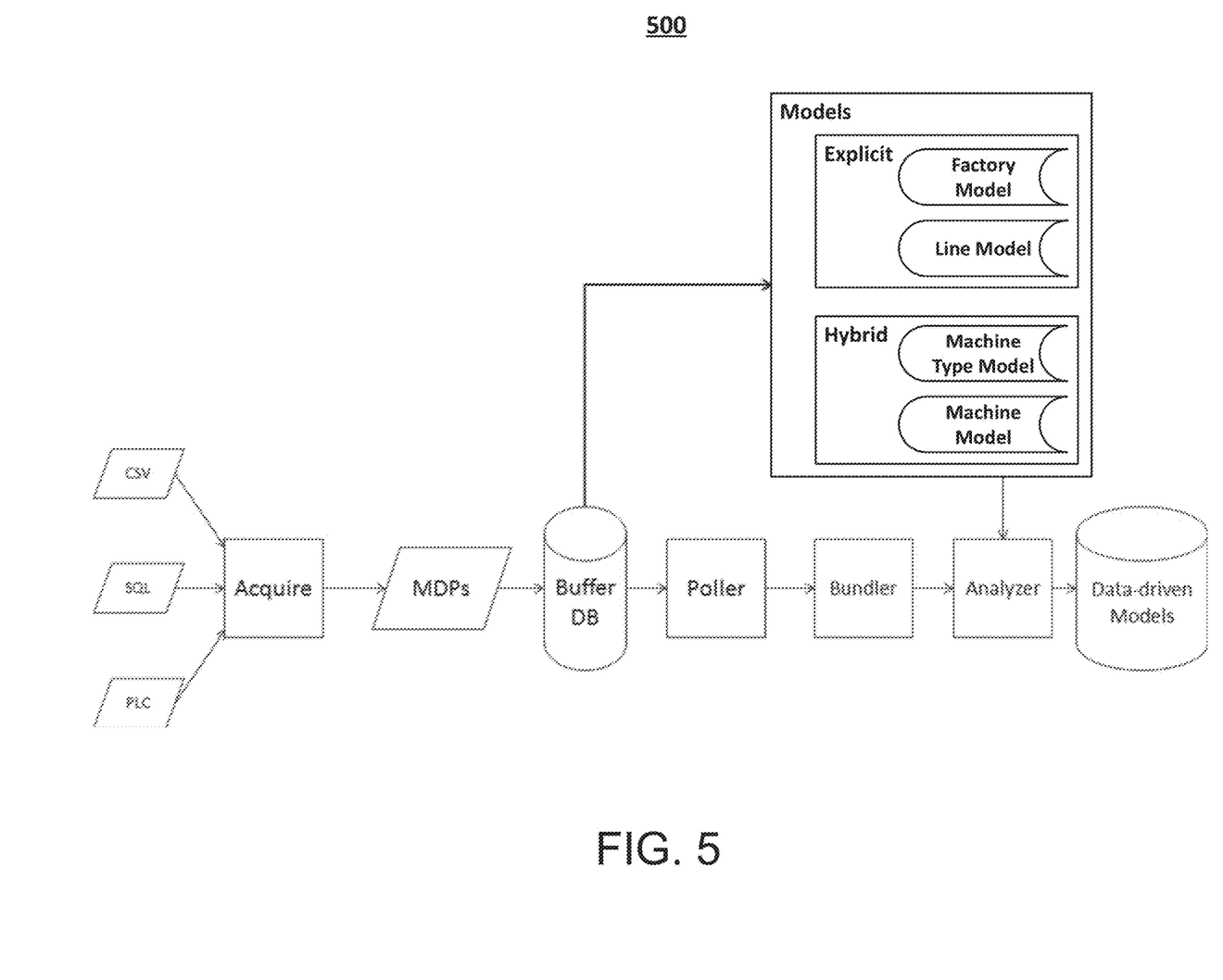
FIG. 5 shows a functional block diagram of a data flow, according to various embodiments.

FIG. 5 illustrates an exemplary functional block diagram showing a flow of data in a system 500 in accordance with some embodiments. Data from three different sources starts at the left side of FIG. 5. Raw data from the first source is in CSV format, while raw data from the second and third sources follow SQL and PLC protocols, respectively. The raw data from all three sources are input into the Acquire block. At the Acquire block, each data stream is labeled with metadata and synchronized timestamps and is transformed out of its native format into a manufacturing data packet (MDP). The data is then stored in Buffer DB, which may be located at a manufacturing site or in the cloud. In this embodiment, no context is applied to the data at this stage.

System 500 includes explicit models for a factory and a manufacturing line. The explicit models include external information not available from the data streams, such as, e.g., shift schedules, factory locations and timezones, and line topographies. System 500 also includes hybrid MachineType and Machine models that are extrapolated from the raw data. The raw data is analyzed to determine the properties of the raw fields included in the data streams. These properties include the data type and data fields described above. Data properties may be determined by applying one or more of the signal processing functions described above and stored as a data field. The data type and data fields may be determined using heuristics and/or classifiers.

Next, system 500 pulls data from the Buffer DB with a Poller. The Poller pulls the data from Buffer DB in chronological order based on the synchronized timestamps. The data moves from the Poller to Bundler and Analyzer blocks, where the data from the different streams is combined (e.g., unioned) for a given machine. The Bundler and Analyzer blocks allocate computations and produce data driven models from the analyzed data using the context from the explicit and hybrid models. The data driven models may include Cycles, Downtimes, Defects. Batches, and Parts. A Cycle model represents a discrete transaction associated with a manufacturing process. A Cycle may be represented by a log of a machine's status over a particular period of time. A Downtime model represents an event of non-productive idle and stop time, A Defect model represents a non-conformant production output, A Defect model may be associated with a single defective product or a batch of defective products. A Batch model represents raw material, related output, and summary data that can be associated with cycles and parts. A Parts model includes a transaction log of serialized information across one or more machines involved with the part and a union of attributes.

In one exemplary implementation, a laser cutting device has three data streams: a PLC controlling a later cutter, a PC appliance with a machine vision system that logs data in CSV format, and an SQL database that includes the types of parts being run and the raw materials being fed into the laser cutting device. An operator loads material into the device and presses a start button. The PC takes a picture of the raw material and generates a path to be cut in the material. The PC then communicates the path to the PLC, which controls the cutter. The cutter executes the path instructions to cut the part. After the part is cut, the machine stops and the operator removes the finished part.

In this implementation, the PLC, PC file, and SQL data are read by a processor, which labels the data, applies a synchronized timestamp, and generates manufacturing data packets. The labeled data includes factory configuration information (e.g., shift schedules, etc.) that is configured manually. The manufacturing data packets are then stored in a buffer database.

Next, the data from the PLC is analyzed and determined to have machine status information. Based on this determination, a data model of the laser cutting device is generated. In this example, the data model is a "Laser Cutter" MachineType and is labeled "laser cutter 1." The device is modeled to start a cycle on the press of the button by the operator (mentioned above) and end a cycle when the PLC execution of controlling the cutter is complete.

Figure 6:
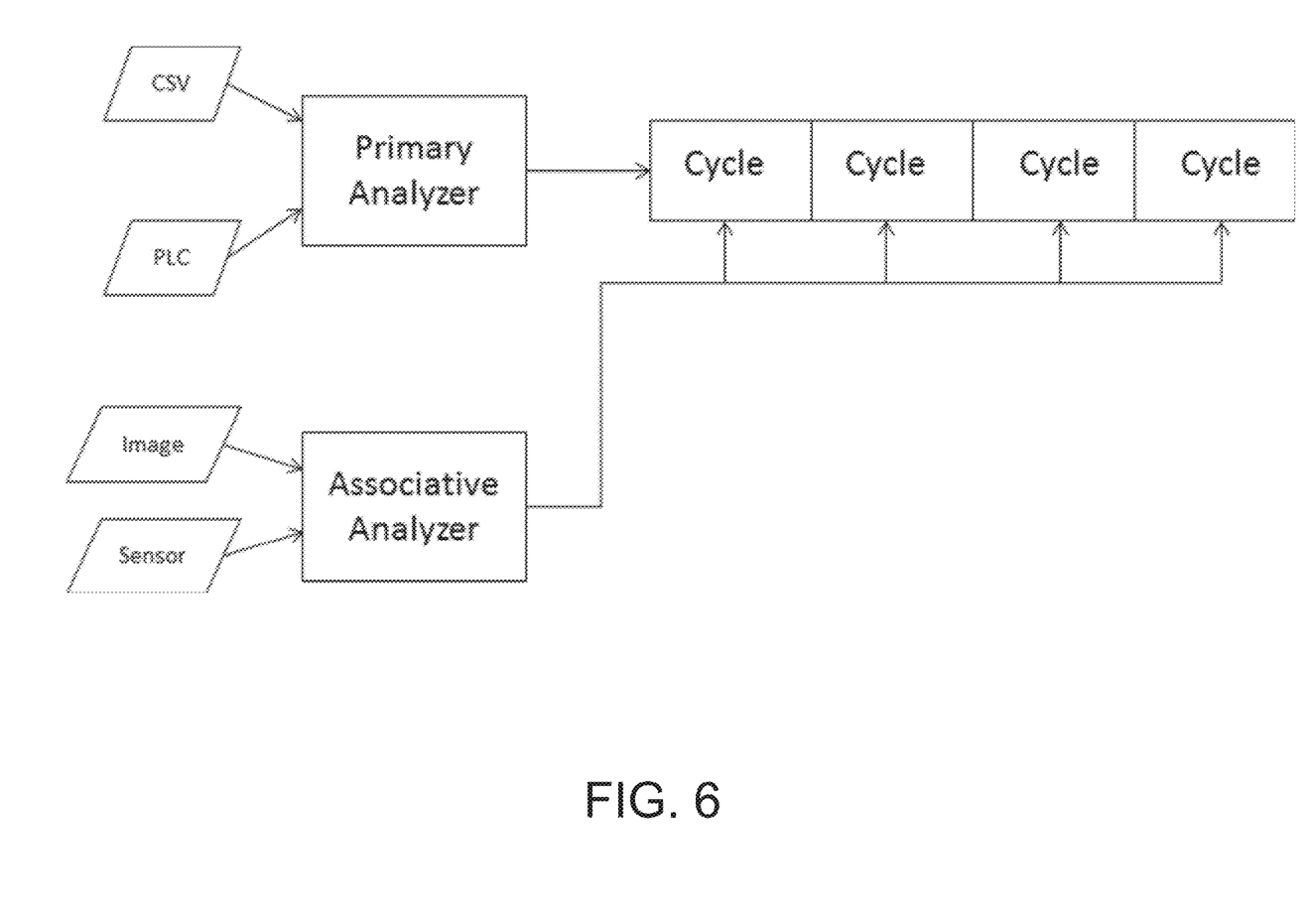
FIG. 6 shows a functional block diagram of a data flow, according to various embodiments.

FIG. 6 illustrates a functional block diagram showing in greater detail the Bundler and Analyzer blocks in FIG. 5. As shown, a data stream from the PLC and a CSV file are routed to a primary (e.g., synchronous) analyzer, and image and sensor data streams are routed to an associative analyzer. The CSV and PLC data are read synchronously from their data sources and contain information necessary to represent the machine operation. They are routed to the primary analyzer to create a data model (e.g., "laser cutter 1"). From the CSV and PLC data, Cycles, Parts, and Batch models are created based on configurations from template Factory, Line, MachineType, and Machine models. The specifically configured analyzer modules are also created. FIG. 6 illustrates the creation of cycle models. The outputs of the primary analyzer and associative analyzer are also used to create the Part and Batch models in a similar manner.

The image and sensor data streams are received asynchronously. They contain information that is not guaranteed to be in chronological order and may be received on a different time cadence than the PLC and CSV data streams. The associative analyzer associates the image and sensor data with existing models (e.g., the laser cutter 1 model) but does not create models. The associative analyzer associates pieces of the image and sensor data with existing models based on any data property, such as a unique identifier (e.g., serial number or timestamp within a defined range). The associative analyzer may also handle data properties, or associate raw binary data, such as file attachments.

In the laser cutter 1 example, the PLC data and the CSV file produced by the PC are routed to the primary analyzer and polled synchronously. The PLC controlling the laser cutter produces data at 1 Hz, and the CSV file with logged events from the PC is polled at approximately the same interval. The SQL data and the image data are read asynchronously. The SQL data is available at the beginning of each factory shift and includes batch information of the incoming raw materials (e.g., red plastic #50002) and the part being produced (e.g., a plastic keychain). The image data is logged to the PC but is logged after the vision system takes a subsequent picture. As a result, the image of a part is not inserted into the system until the next part is run and is therefore delayed relative to the PLC and CSV data associated with the same part. The image is logged with a file name that has the timestamp of when it was taken.

The PLC and CSV data are routed to the primary analyzer, which identifies the data as rich time series data, with events in every cycle, and identifies that the PLC and CSV data are in timestamp order with each other. The image data is identified as a file attachment and is routed to the associative analyzer. The timestamp is extracted from the file name and used to associate the image with the corresponding PLC and CSV data. The SQL data is polled at a 1 minute interval but is received only at the beginning of a shift or other changeover. The SQL data is also routed to the associative analyzer and is associated with all cycles created until the SQL data is updated (e.g., at the beginning of the next shift). The SQL data is also associated with a Batch model, which describes all parts produced on the laser cutting device with the same raw material and part number.

Figure 7:
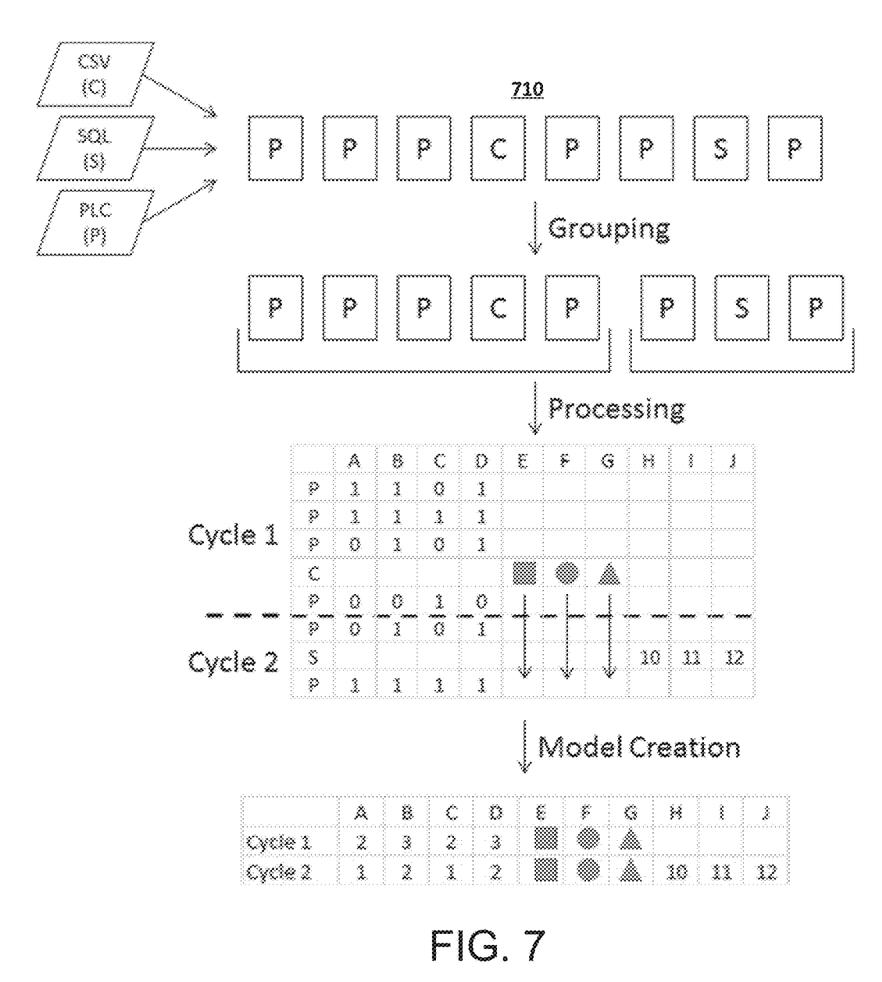
FIG. 7 shows a diagram illustrating an analysis operation, according to various embodiments.

FIG. 7 illustrates the operation of the primary analyzer in greater detail. Within the primary analyzer, the data streams are unified into a single chronological data stream 710 with heterogeneous data payloads. The data streams are routed into a "grouper" for grouping, which uses specific rulesets defined in the analyzer modules to determine transaction boundaries between various events, including: the end of a cycle and beginning of the next cycle, the start of a downtime after a cycle (e.g., an idle event), the start of a downtime during a cycle (e.g., an interruption or "microstop" event), and the start of a cycle after a downtime. The data from all of the streams during each transaction is projected onto a series of data frames A-J (e.g., a tabular data structure similar to a spreadsheet). Data from a stream may populate one or more of the fields in a data frame.

Fields or data streams may be designated as "sticky" such that they are carried through to the next data frame automatically until their value is explicitly changed or removed. This may be useful in cases where a data packet or message is valid for a period of time rather than a single point in time or when reporting from a data source is sparse in the sense that data is only reported when a change in value is detected. After the data frames are populated, the cycle is summarized from the collected raw chronologically assembled data in the model creation process. Information for a machine can be computed from summary statistics of a single column or a group of columns that describe the machine during the corresponding time period. For example, the minimum, maximum, and mean values of a raw field may be reported, or a serial number may be unpacked into identifiable attributes, such as part information. The rules for grouping may be set globally or for specific processes or parts. The rules can also return empty values if there is insufficient information (e.g., if there is an error or warning code).

In the laser cutter example, the laser cutter can produce two part types: a keychain and a set of coasters. The keychain is a single part that is produced in a time T1. The set of coasters includes multiple parts and is produced in a time T2, which is greater than T1. The PLC data includes target position, real position, the voltage to the laser, and a bit for an error code (e.g., when the temperature to voltage exceeds a set limit, which indicates that the lens of the laser needs to be cleaned). The CSV data includes a button press time, a flag indicating whether an image has been taken, path computation time, machine start time, machine stop time, and event indicators for machine set point changes (e.g., when an operator changes the laser power). The image data includes the image and the timestamp of the capture time in the file name. The SQL data includes a raw material SKU and a part type number (e.g., keychain or coaster).

The PLC data and the CSV data have evaluation functions that are determined by the part type number provided by the SQL server. In the present example, the PLC data has different evaluation functions than the CSV data. For example, the ideal time to produce a keychain may be specified to be smaller than the ideal time to produce a coaster. Also, for the coasters, there is an additional field that indicates the number of coasters produced from the raw material, which may be variable.

Figure 8:
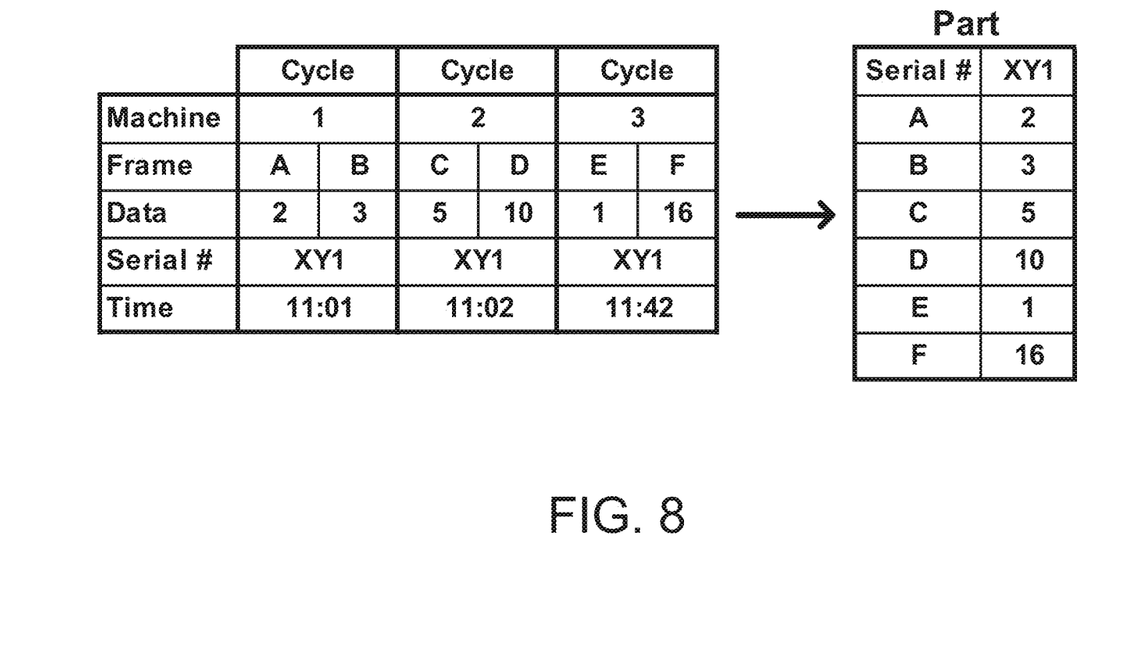
FIG. 8 shows a summary data model, according to various embodiments.

Turning to FIG. 8, a summary model is illustrated. FIG. 8 illustrates two data structures: a union of attributes from a cycle associated with a part and a transaction log for the part. The transaction log includes which machines had a transaction with the part and timestamps. Associative analyzers may also record data on parts (e.g., images). After each cycle is produced, it is determined whether the cycle has any association with a part. If so, the data from the cycle is included in the data model for the part.

Figure 3:
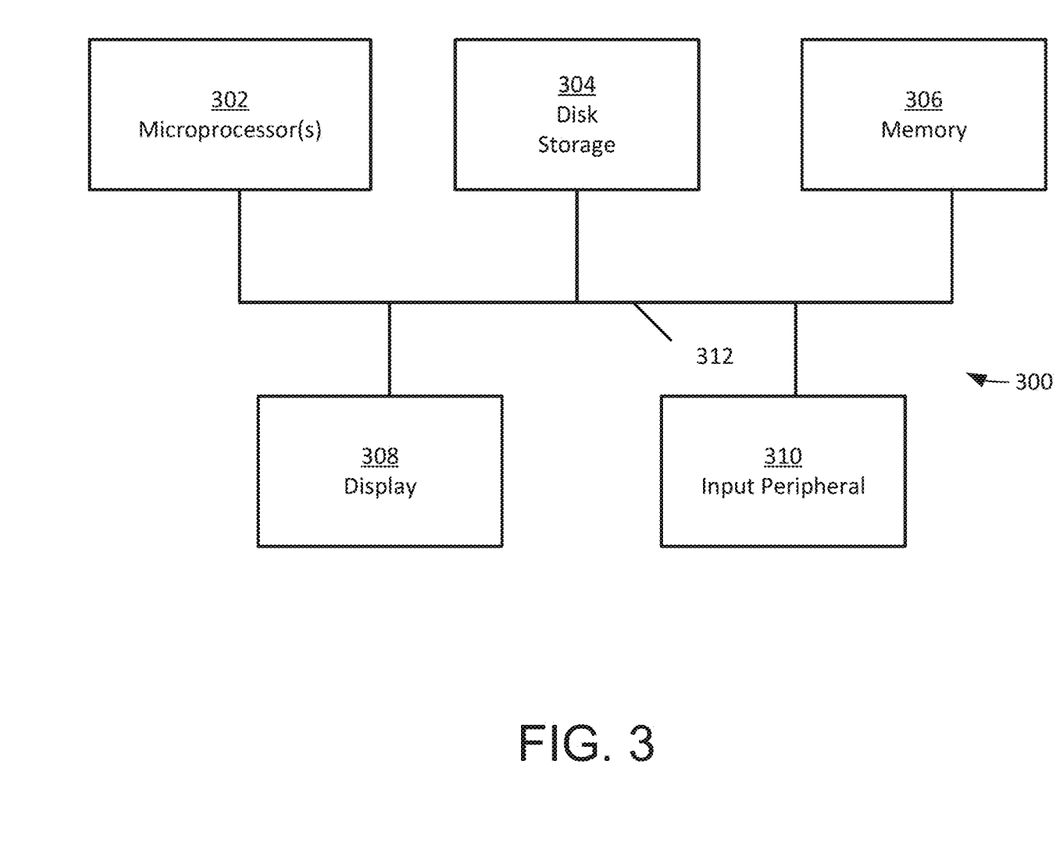
FIG. 3 shows a block diagram of an exemplary computing system upon which various features of the present disclosure may be provided.

Turning now to FIG. 3, computer system 300, which may be used to implement the above-described embodiments, is illustrated. In some embodiments, computer system 300 includes one or more microprocessors 302 to execute computer-readable instructions; non-transitory computer memory 306 to store computer-readable instructions, and disk storage 304 for storing data and computer-readable instructions; a display 308 for displaying system outputs; and an input peripheral 310 (e.g., keyboard, mouse, touch screen, and so on) to receive input from a user. The one or more microprocessors, memory, disk, display, and input units are connected by one or more bidirectional buses that transmit data and/or computer-readable instructions between the units.

The computer system 300 of FIG. 3 may be used, for example, to implement any of the server 116, databases 118a-c, and/or controllers 104 of FIG. 1. Disk storage unit 304 may be used to archive digital images or other sensed data received from one or more controllers 104 or sensors 106a-g and/or store user interface application features and user inputs. One or more microprocessors 302 may be used for root cause analysis calculations, to generate and communicate alerts, and to provide other functionalities of the user interface. Memory 306 may be used to store user interface software, statistical algorithms, computational results, queries, or other types of data or computer-readable instructions. Further, the computer system 300 may be used to implement the remote terminal 120 of FIG. 1. In this case, the one or more microprocessors 302 may be used to execute the user interface that is displayed on display 308. The display 308 may display the results of the root cause analysis, quality metrics, sensor data, system status, or other types of information related to the system 100. Input peripheral 310 may enable the user to enter new queries or to remotely update the controller software or sensor settings. Other examples are possible.

What is claimed is:

1. A computer system for monitoring manufacturing, comprising:
   one or more processors; and
   memory that is communicatively coupled with and readable by the one or more processors, the memory storing one or more programs that, when executed by the one or more processors, cause the computer system to perform operations including:
   receiving data from a plurality of data sources;
   outputting a manufacturing data packet that is based on the data from the plurality of data sources;
   storing the manufacturing data packet in a buffer;
   inputting data from the buffer into a data model;
   obtaining data from the buffer in chronological order;
   receiving the data obtained from the buffer;
   obtaining data from the data model; and
   outputting a data driven model using the data from the data model and the data received from the buffer.

2. The computer system of claim 1, wherein the plurality of data sources includes data streams.

3. The computer system of claim 1, wherein the data from the plurality of data sources includes data in a first format and data in a second format, wherein the first format and the second format are different.

4. The computer system of claim 1, wherein the data model includes a set of one or more explicit models.

5. The computer system of claim 4, wherein the set of one or more explicit models include shift schedules, factory locations time zones, or line topographies.

6. The computer system of claim 1, wherein the data model includes a set of one or more hybrid models.

7. The computer system of claim 6, wherein the set of one or more hybrid models are extrapolated from the data from the buffer.

8. The computer system of claim 1, wherein the data driven model includes a cycle model, a downtime model, a defect model, a batch model, or a parts model.

9. A non-transitory computer readable storage medium storing one or more programs configured to be executed by one or more processors of a computer system for monitoring manufacturing, the one or more programs including instructions for:
   receiving data from a plurality of data sources;
   outputting a manufacturing data packet that is based on the data from the plurality of data sources;
   storing the manufacturing data packet in a buffer;
   inputting data from the buffer into a data model;
   obtaining data from the buffer in chronological order;
   receiving the data obtained from the buffer;
   obtaining data from the data model; and
   outputting a data driven model using the data from the data model and the data received from the buffer.

10. The non-transitory computer readable storage medium of claim 9, wherein the plurality of data sources includes data streams.

11. The non-transitory computer readable storage medium of claim 9, wherein the data from the plurality of data sources includes data in a first format and data in a second format, wherein the first format and the second format are different.

12. The non-transitory computer readable storage medium of claim 9, wherein the data model includes a set of one or more explicit models.

13. The non-transitory computer readable storage medium of claim 12, wherein the set of one or more explicit models include shift schedules, factory locations time zones, or line topographies.

14. The non-transitory computer readable storage medium of claim 9, wherein the data model includes a set of one or more hybrid models.

15. Non-transitory computer readable storage medium of claim 14, wherein the set of one or more hybrid models are extrapolated from the data from the buffer.

16. The non-transitory computer readable storage medium of claim 9, wherein the data driven model includes a cycle model, a downtime model, a defect model, a batch model, or a parts model.

17. A method for monitoring manufacturing, comprising:
   receiving data from a plurality of data sources;
   outputting a manufacturing data packet that is based on the data from the plurality of data sources;
   storing the manufacturing data packet in a buffer;
   inputting data from the buffer into a data model;
   obtaining data from the buffer in chronological order;
   receiving the data obtained from the buffer;
   obtaining data from the data model; and
   outputting a data driven model using the data from the data model and the data received from the buffer.

18. The method of claim 17, wherein the plurality of data sources includes data streams.

19. The method of claim 17, wherein the data from the plurality of data sources includes data in a first format and data in a second format, wherein the first format and the second format are different.

20. The method of claim 17, wherein the data model includes a set of one or more explicit models.

* * * * *